Sept. 21, 1965    J. W. DALLY    3,207,871
DIGITAL INDICATING PRESSURE GAGE
Filed Aug. 14, 1961    3 Sheets-Sheet 1

INVENTOR.
JAMES·W·DALLY
BY
ATTORNEY

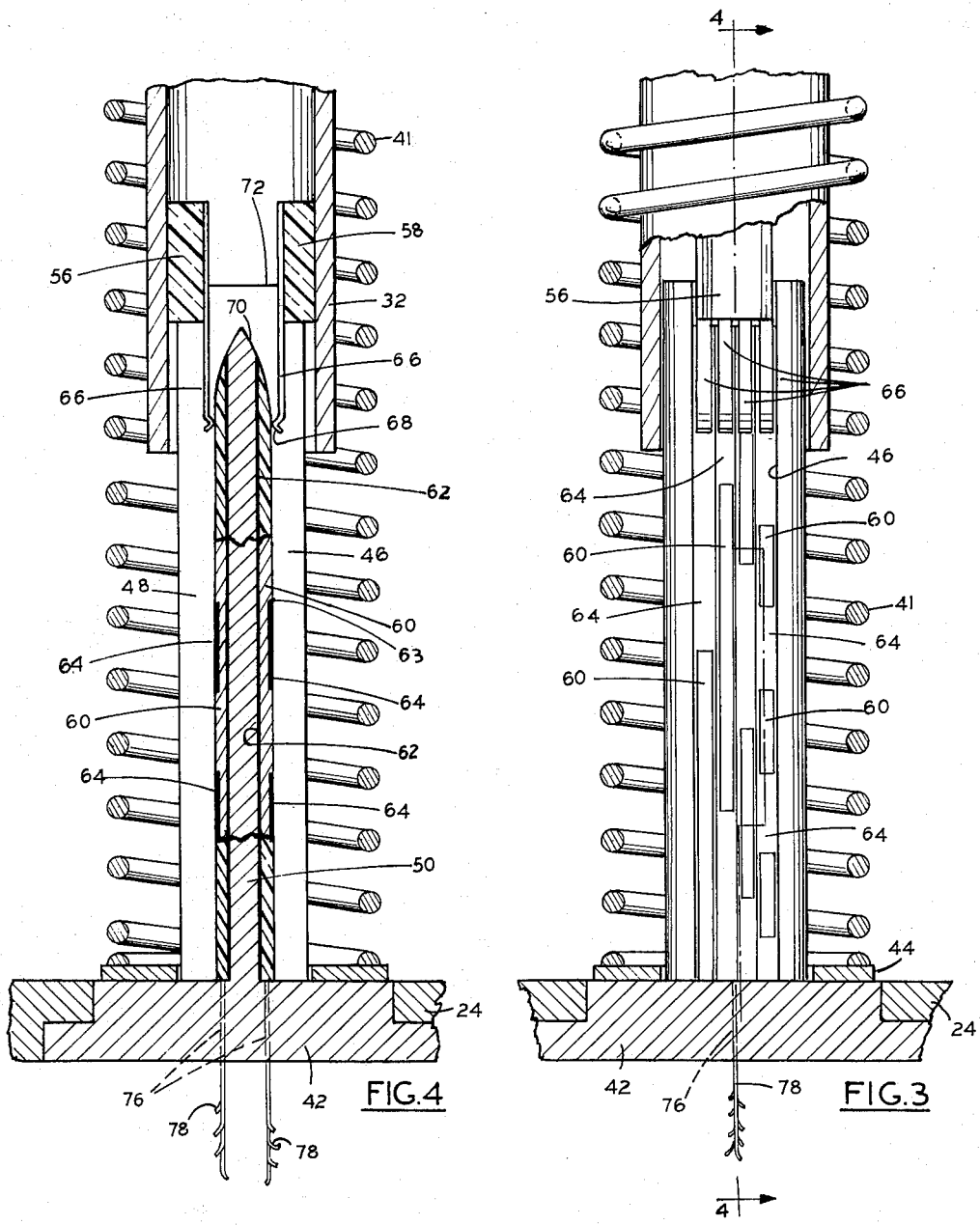

Sept. 21, 1965  J. W. DALLY  3,207,871
DIGITAL INDICATING PRESSURE GAGE
Filed Aug. 14, 1961  3 Sheets-Sheet 3

INVENTOR.
JAMES·W·DALLY
BY
ATTORNEY

United States Patent Office 3,207,871
Patented Sept. 21, 1965

3,207,871
DIGITAL INDICATING PRESSURE GAGE
James W. Dally, Ithaca, N.Y., assignor to Therm, Inc.,
Ithaca, N.Y., a corporation of New York
Filed Aug. 14, 1961, Ser. No. 131,437
7 Claims. (Cl. 200—82)

This invention relates to a device for measuring pressure by mechanical displacement, and converting the displacement to an electrical output that is digitalized.

Gages heretofore adapted to render an electrical indication have for the most part delivered an analog output, or a voltage or current output that varies directly with the pressure on the gage. To utilize such an analog output with high speed data processing equipment it is necessary to convert the output to digital form. Such conversion generally requires an amplifier to increase the voltage or power output of the gage. Further a servo motor driven by the amplified gage output driving an analog to digital converter is required. The digital pressure gage of the present invention eliminates any necessity for the foregoing, by reason of the digital output derived directly from linear motion.

It is an object of the invention to provide a pressure gage with a digital output.

It is a further object of the invention to provide a pressure gage with a number of different digital codes so that it can be employed in various high speed data processing equipment currently in use.

It is a still further object of the invention to provide an output signal which is sufficiently large in both power and voltage, irrespective of gage indication so that it can be employed in a telemetering system without further amplification.

It is a still further object of the invention to provide a pressure gage which may operate at high temperatures, and a still further object of the invention is to provide a pressure gage which is of simple design, economical to manufacture, rugged, accurate, linear, and reliable in operation.

The above and other objects of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 3 is a fragmentary elevational view of an indicator code chart, with parts in section;

FIGURE 4 is a sectional view taken on the broken line 4—4 of FIGURE 3;

Figure 1:
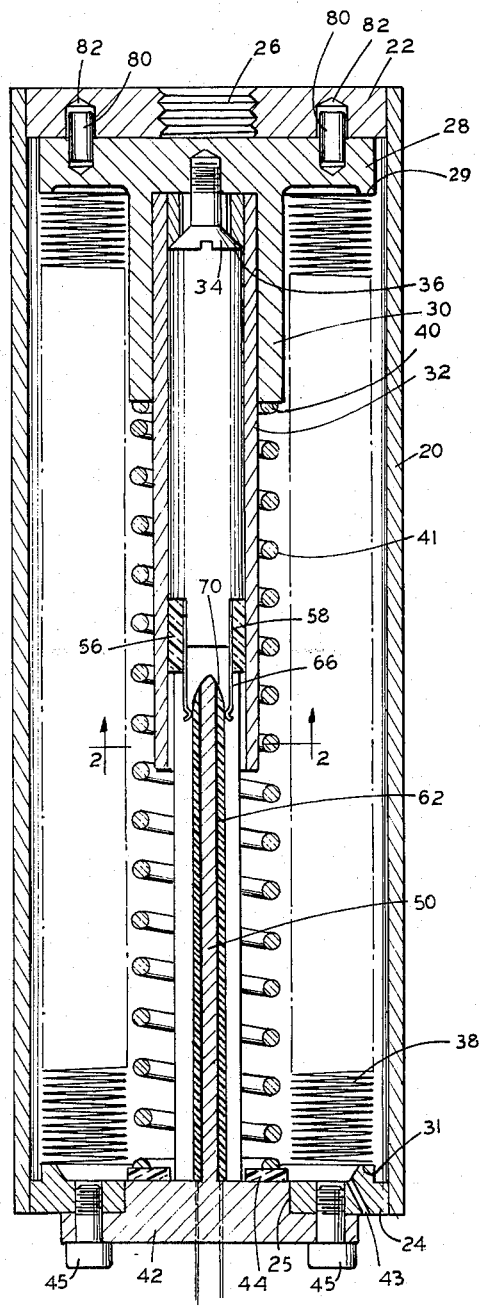
FIGURE 1 is a longitudinal section taken through the gage.
Figure 2:
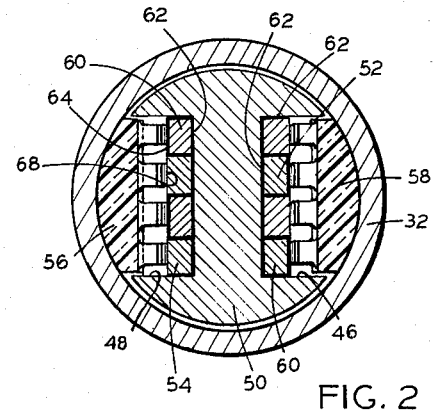
FIGURE 2 is a transverse, enlarged view, taken substantially on the line 2—2 of FIGURE 1.

Referring to FIGURES 1-4 inclusive there is shown a gage cylinder 20 having end heads 22 and 24 soldered or otherwise imperviously secured in place. The head 22 is provided with a threaded aperture 26 to receive a connection to a source of fluid pressure to which the gage is to respond, whereas the end head 24 is provided with a central aperture 25 for the insertion of a code track or tracks supported from a closure member 42, as will be described more in detail hereinafter. Within the cylinder 20, is a piston like member 28, having a hollow stem 30 within which is secured a tubular guide member 32, the latter being secured in place, as by a coaxial screw 34, the head of which bears upon the internal shoulder 36 formed on the end of a short sleeve soldered or otewise secured to the tube 32 so as to be integral therewith. Around the stem 30 and extending from the piston 28 to the end head 24 is an annular resilient imperforate bellows 38, the annular ends of which are affixed and annularly sealed to the piston 28 and the head end 24 as at 29 and 31 respectively, by soldering or other means.

Bearing against the shoulder 40 of the piston stem 30, and surrounding the guide sleeve 32 is a calibrated helical compression spring 41 which extends to and is seated upon an annular spacer 44 seated on the end closure member 42. The end closure member 42 is secured to the cylinder head end by a plurality of screws 45, and is readily removable, and the aperture 25 in the end head is of sufficient size so as to permit the ready removal and substitution of one calibrated spring for others of different calibrations.

Rigidly affixed to or formed integral with the end closure member 42, is an elongated code track support tongue 50, which extends axially into the gage cylinder and telescopically within the guide member 32. The tongue is provided with elongated channels 46 and 48 on its opposite sides for the reception of code track assemblies 52 and 54. Within the guide tube 32 are affixed brush support blocks 56 and 58 which may be of suitable plastic or other insulating material.

The brush blocks are of a width to freely slide within the channels 46 and 48 and act as keys to prevent relative rotation between the guide tube 32 and the code track support tongue. Secured in each of the channels 46 and 48 are a plurality of conductor bars 60 lying side by side, and insulated from one another and from the tongue 50 by insulation as at 62. Each of the bars have their outward faces provided with exposed rectangular contact faces and intervening insulation areas to provide a particular code track pattern as will appear more fully hereinafter. Such insulation areas may be formed in the bars 60 by milling shallow grooves 63 therein, and filling with a plastic insulation as at 64, in the manner shown in FIGURES 2 and 4.

Mounted and secured on each of the brush blocks 56 and 58 is a comb like contact finger piece, having spring fingers 66, with bar contact portions 68, one for each bar. Such contact fingers may be electrically connected to the guide tube 32, or one of the bars 60 may have a continuous exposed contact surface and act as a common lead to the contact finger piece.

The inner end of the tongue 50, and the bars 60 terminate in a wedge shape 70, short of the end 72 of the side flanges formed by the channels 46 and 48, to facilitate spreading of the contact fingers 66 on insertion of a code track assembly including the end plate 42 and tongue 50. The end plate 42 is provided with small apertures 76 leading to the ends of the code track bars, through which an insulated lead from each bar may be brought out, as at 78.

Dowel pins 80 in the end of the member 28 nest in corresponding apertures 82 in the end plate 22, to prevent the member 28 from turning, as when the code track assembly is removed, and it is desired to remove or replace the tube 32, which is facilitated by removal of the screw 34. It will be understood that the tube, brush blocks and contact fingers constitute an assembly, adapted to cooperate with a particular code track assembly, and with changes in code track assemblies, such as an increase or decrease in the number of contact bars, a brush block assembly having a corresponding number of spring fingers will be substituted.

The ends of the calibrated spring 41, may be affixed to the spacer 44, to assure maintenance of the free length of the spring and to prevent any clearance or precompression of the spring. An air vent 43 may be provided in the closure member 42. The bellows 38 may comprise a series of resilient disks alternately oppositely dished, the inner and outer edges of which are welded or otherwise secured to the immediately adjacent disks to provide the bellows, the outer edges of the end disks being welded, soldered or otherwise to the member 28 and end plate 24 as previously set forth.

It will be seen from the foregoing construction that a rigid gage is provided which upon application of pressure through the aperture 26, will drive the piston member 28 against the calibrated spring 41, with the area external of the bellows being also subjected to such pressure.

Figures 5, 6:
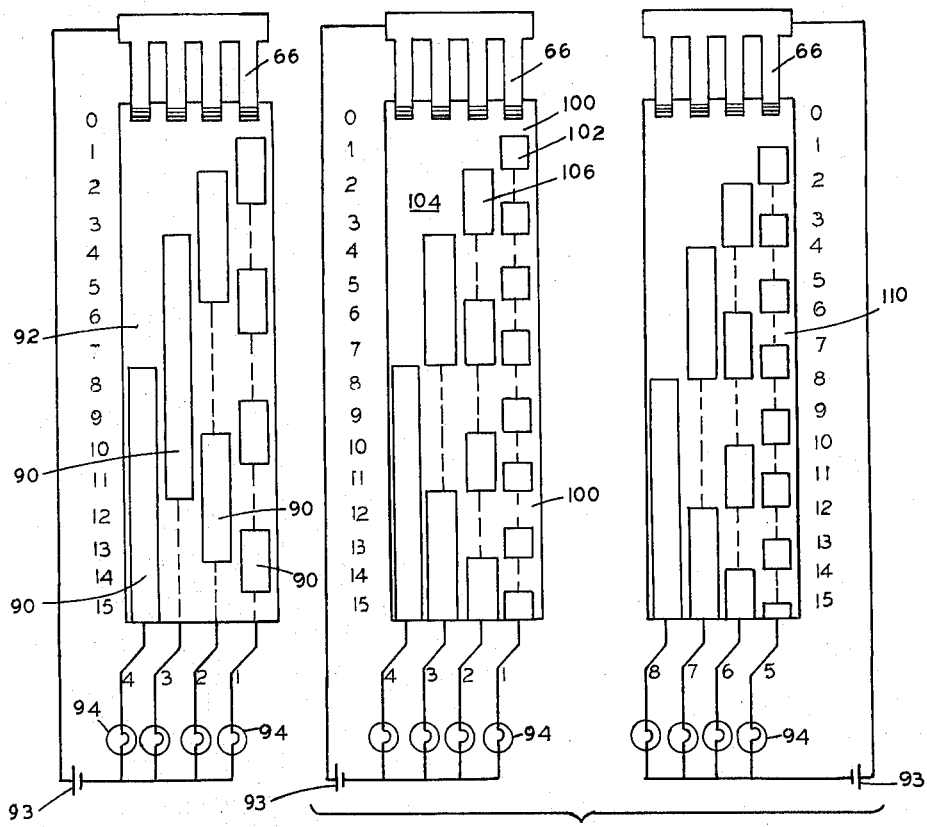
FIGURE 5 is a diagrammatic illustration of a typical code chart of the Gray type.
FIGURE 6 is a diagrammatic illustration of a pair of code charts of the binary type.

By providing suitable code tracks designed for cooperation with a particular calibrated spring, movement of the contact fingers relative to the code track will supply positive information as to the movement of the pressure member 28. In FIGURE 5, a code track comprised of four bars side by side is shown. Each bar has bare contact portions 90, and intervening insulation 92. A circuit connecting the contact fingers through a source of energy 93, and indicators such as 94 connected in series with each bar serves to provide a different indication for each of 15 possible increments of movement, in addition to zero, through which the member 28 may move, and such a code is sometimes refered to as the Gray code because in moving from one increment to another only a single circuit change is effected. If a greater number of increments are desirable, the number of bars may be increased, the number of increments possible being substantially doubled with the addition of each bar.

In FIGURE 6, there is shown at the left a binary code track or chart 100 comprising contact areas 102 and insulation 104. Such a code track is more suitable in that the signal output may be more readily adapted to computer circuitry. In such a code however, more than one circuit change is effected in shifting from certain increments to the next, and since the finger contacts, may not always simultaneously effect all changes, due to contact tolerances, a second code track or chart 110 staggered with respect to the first by one half of an increment, may be employed, in circuitry designed to prevent false indications as will be understood in the art. For example should a finger contact 66 move from contact with contact area 102 before another finger makes contact with contact area 106, a false zero reading would result, and should a contact finger make contact with contact area 106 before another finger breaks contact with contact area 102, both circuits would be closed, which would indicate the increment 3, whereas actually increment 1, or increment 2 is correct. Use of the second code chart 110, with its contact areas staggered so as to overlap the divisions between successive increments, when employed in circuitry understood in the art will serve to prevent false indications which might result from the use of a single code track of the binary type.

Thus the indication from the staggered track 110 will prevail over the indication from the track 100, if the indication from track 100 is not identical with the indication from track 110, or exactly one increment greater than the indication from track 110. If the indication from track 100 is less than, or more than one greater than, the indication from track 110, the indication from track 100 is false, and the indication of track 110 will prevail.

It will be seen that the channel member 50 provides in its opposite channel, space for two such code tracks, staggered as is shown in FIGURE 6. If the Gray code system is employed, the opposite channels of the member 50 would support eight bars in the manner shown, and the increments would be greatly refined. On the other hand where both channels are required by a pair of binary code tracks the number of bars may be increased for refinement of the increments. It will also be apparent, that instead of staggering the relation of the contact areas of the two charts 100 and 110, the brush contacts of one comb may be offset axially one half of an increment.

It will be apparent that in FIGURE 5 that as the contacts 66 progress along the track a different combination of signals of the lamp 94, #1, 2, 3 and 4, will occur at each increment.

For example, at increment 15, lamp 94–4 will show, and none of the others. At increment 10, all lamps will show. While lamps are illustrated for ease of explanation, the circuits may be so connected as to provide direct indication of the number of the increment, or a pressure, by apparatus well understood by those skilled in the art.

From the foregoing it will be apparent that the gage is capable of being adapted to extreme temperature conditions by the use of proper materials. It will also appear that by the ready interchangeability of various calibrated springs, and code charts and corresponding brush assemblies, a variety of pressure conditions may be gaged and the information instantly transmitted to data processing apparatus. In practice, the entire end block and channel member 50, may be an assembly, as may be the tube 32 and the brushes. Such assemblies may be quickly removed and other assemblies for different measurements substituted.

The gas pressure being measured may be an indication of temperature, and the result of the gas pressure increase due to temperature changes. Thus while the embodiment shown is referred to as a pressure gage, it may also be a temperature gage. Further the gage might be hydraulically actuated in response to relative movement of a master cylinder responding to relative movement between parts.

While a single embodiment of the invention has been illustrated, with suggested code charts, it is to be understood that the invention is not limited thereto. As various changes in the construction and arrangement may be made without departing from the spirit of the invention, as will apparent to those skilled in the art, reference will be had to the appended claims for a definition of the limits of the invention.

What is claimed is:

1. A gage comprising spaced members one of which moves relative to the other proportionately in response to pressure, a code chart carried by one of the members having a plurality of parallel rows of electrical contact conductive areas spaced by non-conductive areas, in which all of the conductive areas in each row are connected together electrically, and in which each of said rows are disposed in the direction of relative movement between the members, a plurality of contacts, one for each row, carried by the other member and movable relatively over their respective rows of the chart, and an electric circuit for each row of conductive areas and its contact including a current actuated signalling device remote from the gage, said conductive and non-conductive areas being so disposed as to establish successively different combinations of open and closed circuits on successive uniform increments of relative movement between the members for indicating through the signalling devices the gage response.

2. A gage in accordance with claim 1 wherein the conductive areas in the rows are disposed so as to provide a binary sequence of signal combinations by means of the signal devices, upon successive increments of relative movement between the members.

3. A gage comprising a tubular housing having a pressure head at one end having provision for connection to a source of fluid pressure to be measured, an annular head at the other end having a closure member, expansible chamber means within the housing comprising a piston, and an annular flexible bellows extending between the piston and said annular head, a calibrated helical compression spring disposed within the bellows and extending from said piston to said closure member, a tubular member disposed within said spring and affixed to said piston, and a tongue affixed to said closure member and extending telescopically into said tubular member, and a plurality of electrical contacts carried by said tubular member, and contact bars comprising a code chart carried by said tongue and adapted to coact with said contacts, each of said bars being provided with alternate insulation and contact surfaces.

4. A gage comprising a tubular housing having a pressure head at one end having provision for connection to a source of fluid pressure to be measured, an annular head at the other end having a closure member, expansible chamber means within the housing comprising a piston, and an annular flexible bellows extending between the piston and said annular head, a calibrated helical compression spring disposed coaxial in respect to the bellows and interposed between said piston and closure member, a tubular member disposed coaxially within said bellows and affixed to said piston, and a tongue affixed to said closure member and extending telescopically into said tubular member, and a plurality of electrical contacts carried by said tubular member, and contact bars comprising a code chart carried by said tongue and adapted to coact with said contacts, each of said bars being provided with alternate insulation and contact surfaces.

5. A gage comprising a tubular housing having a pressure head at one end having provision for connection to a source of fluid pressure to be measured, an annular head at the other end having a closure member, expansible chamber means within the housing comprising a piston, and an annular flexible bellows extending between the piston and said annular head, a calibrated helical compression spring disposed within the bellows and extending from said piston to said closure member, a tubular member disposed within said spring and affixed to said piston, and a tongue having a longitudinal channel affixed to said closure member and extending telescopically into said tubular member, a plurality of electrical contacts carried by said tubular member, and contact bars comprising a code chart disposed in said channel and adapted to coact with said contacts, each of said bars being provided with alternate insulation and contact surfaces, to provide a plurality of differing signalling circuits for successive increments of telescopic movement between the contacts and bars.

6. A gage according to claim 5 in which the electrical contacts, and the spring are removable through the annular head, on removal of the closure member and tongue supported code chart.

7. A gage comprising a tubular housing having a pressure head at one end having provision for connection to a source of fluid pressure to be measured, expansible chamber means within the housing comprising a piston, a calibrated helical compression spring disposed within the housing and urging said piston toward said head, a tubular member affixed to said piston, and a tongue affixed to said housing and extending telescopically into said tubular member, and a plurality of electrical contacts carried by said tubular member, and contact bars comprising a code chart carried by said tongue and adapted to coact with said contacts, each of said bars being provided with alternate insulation and contact surfaces.

References Cited by the Examiner
UNITED STATES PATENTS

| | | | |
|---|---|---|---|
| 453,484 | 6/91 | Jewell | 200—82 |
| 695,118 | 3/02 | Read | 200—82 |
| 1,087,607 | 2/14 | Pointing | 200—82 |
| 1,115,022 | 10/14 | Quick | 200—82 |
| 1,593,222 | 7/26 | Russell | 200—83 |
| 2,300,656 | 11/42 | Doll | 200—82 |
| 2,938,969 | 5/60 | Gladden et al. | 200—37 X |
| 3,104,292 | 9/63 | Holzer | 200—46 |

BERNARD A. GILHEANY, *Primary Examiner.*
ROBERT K. SCHAEFER, *Examiner.*